F. H. PAGE.
HOG WATERER.
APPLICATION FILED JULY 5, 1918.
1,308,806.
Patented July 8, 1919.
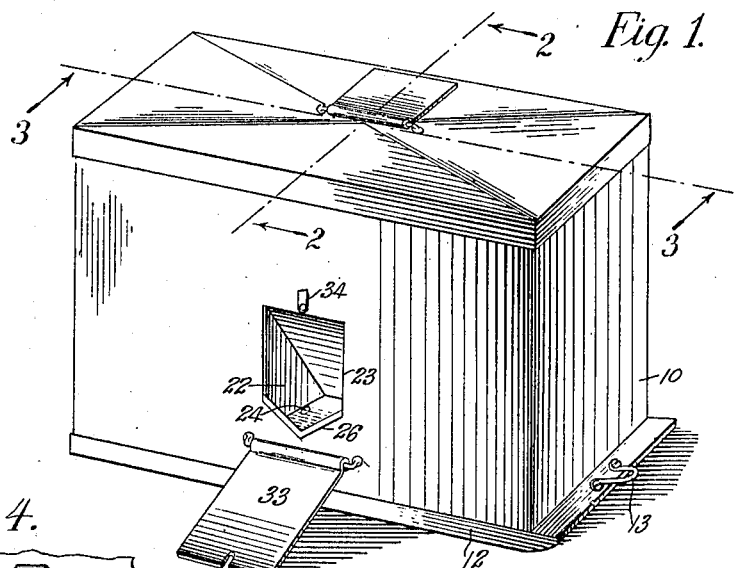
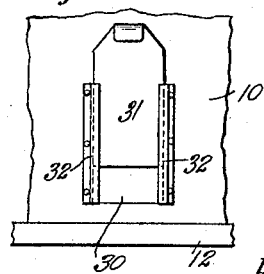
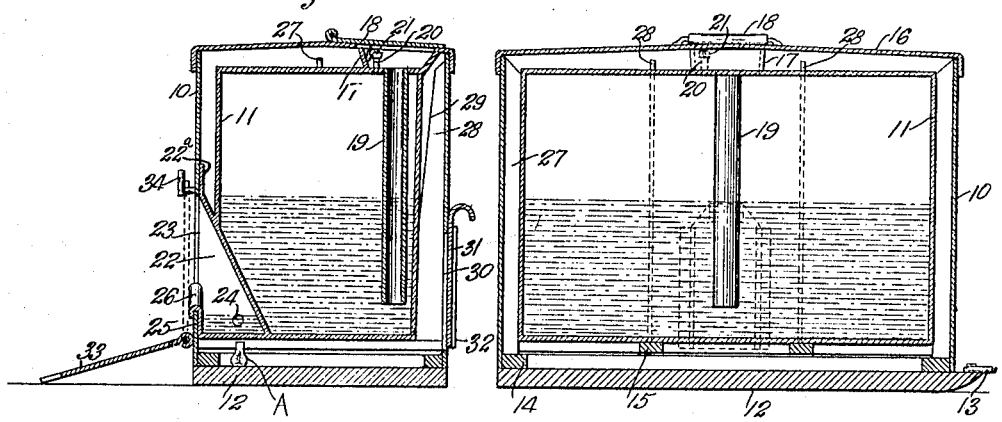
WITNESSES
INVENTOR
Frank H. Page
BY
ATTORNEYS

UNITED STATES PATENT OFFICE.

FRANK HOWARD PAGE, OF WAVERLY, IOWA.

HOG-WATERER.

1,308,806.  Specification of Letters Patent.  Patented July 8, 1919.

Application filed July 5, 1918. Serial No. 243,410.

*To all whom it may concern:*

Be it known that I, FRANK HOWARD PAGE, a citizen of the United States, and a resident of Waverly, in the county of Bremer and State of Iowa, have invented a new and Improved Hog-Waterer, of which the following is a description.

A further object of the invention is to provide a hog waterer in which a water tank is removably supported within an outer casing and spaced from the latter whereby to afford a measure of protection to the water tank against extreme heat or cold by reason of the intervening air space and also by reason of the outer casing affording access for the entrance and removal of a lamp for heating said space.

The invention furthermore has for an object to provide a trough on the tank so formed relatively to the formation of the outer casing at the trough opening that in any flushing or overflowing of the trough, the overflow will pass out through the casing and be prevented from entering the space between the tank and casing.

The invention also has for an object to provide centering means for the tank so formed and arranged as to coördinate the trough and casing in centering the tank.

The invention has also for an object to provide a hog waterer improved in various particulars with respect to the filling and venting thereof as well as affording protection in closing the trough when the water is being transported, or over night, or under weather conditions making it desirable to aid in conserving the temperature of the water.

Reference is to be had to the accompanying drawings forming a part of this specification, it being understood that the drawings are merely illustrative of one example of the invention.

Figure 1 is a perspective view of a hog waterer embodying my invention;

Fig. 2 is a transverse vertical section on the line 2—2, Fig. 1;

Fig. 3 is a longitudinal section on the line 3—3, Fig. 1;

Fig. 4 is a fragmentary rear view given to show the door and opening whereby a lamp may be entered in the space between the tank and casing or removed.

In carrying out my invention in accordance with the illustrated example an outer casing 10 is provided preferably rectangular, and within the outer casing is a water tank 11 spaced at all sides from the casing to provide an intervening air space. The casing 10 is built on or rigidly secured to the top of a land boat 12 having any suitable means to hitch a draft animal or team, there being indicated a clevis-like device 13 on said boat. The boat 12 constitutes the bottom of the casing 10 and the latter is secured thereto by any suitable means as for example a rectangular frame 14 within the casing and rigid with the top of the boat. The tank 11 is supported on any suitable cross members 15, or the like within the casing and in practice these are of a character to sustain the tank a substantial distance from the boat 12 so that a small lamp A may be placed beneath the trough hereinafter described to furnish sufficient heat to prevent freezing. The casing 10 is provided with a removable top 16 to permit the removal of the tank for repair, cleaning, or the like.

For supplying water to the tank 11 the latter is formed at the top, near one side, with a broad funnel 17 rigid therewith from which funnel a depending inlet pipe 19 extends to near the bottom of the tank. In the funnel a short vent pipe 20 rises from the tank and rigid therewith, and is provided at the top with any known form of vent cock of any approved type conventionally indicated at 21, whereby said cock may be opened when water is supplied to the tank. The top 16 of the casing has an opening in register with the funnel 17, said opening being adapted to be closed by a suitable cover 18. The tank is formed at the front with a trough 22 accessible through an opening 23 in the casing 10. The back wall of the trough is inclined and said trough has a low front wall 25, the upper edge of which is in the form of a downturned lip 26 adapted to hook over the edge presented by the casing 10 at the bottom of the opening 23. Said edge and the lip 26 are V-shaped so that the lip is depressed at the center, whereby any overflow from the trough will pass outward through the opening 23 at the apex of the V-shaped lip 26 and will be prevented from passing into the space between the tank and outer casing.

Vertical ribs are provided on the casing 10 at the interior to center the tank 11 therein, there being in practice ribs 27 at the ends of the casing and ribs 28 at the back of said casing. The ribs 28, it will be noted in Fig. 2 are beveled as at 29 from the top edge to point below the top of the opening 23, the purpose of which is to permit the out-turned lip 26 to clear the casing 10 at the top of said opening when the tank is removed, and when the tank is inserted said bevels 29 will deflect the tank to the front, whereby to project the lip 26 through the opening 23 to overlie the edge of the casing at the bottom of said opening. The tank 11 at the top and sides of the trough 22 is flanged as at 22ᵃ to bear against the inner surface of the front of the tank 10 at the top and sides of the opening 23.

For the entrance or the removal of the lamp 10ᵃ an opening 30 is provided at the back of the casing 10, the opening being closed by a slidable door 31 moving in guides 32. I provide also an approach or ramp 33 for the hogs at the front of the trough 22 and said ramp is hinged at its inner edge of the casing to be swung upwardly to the closed position indicated in dotted lines in Fig. 1, thereby closing the trough which will be desirable in transporting the waterer and also will conserve the temperature of the water.

By making the waterer with a land boat 12 as part thereof and rigid with the tank, the waterer may be hauled simply by hitching the draft animal or animals thereto, and the arrangement involves no additional cost since the boat forms the bottom of the outer casing.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A waterer of the class described, including an outer casing, a water tank removably supported within the casing and spaced therefrom, and a trough on the tank at the outside thereof, said trough communicating with the interior of the tank to be fed by the latter and being rigid with the tank to be removable therewith from the casing, said casing having an opening at the trough, the front wall of the trough having a lip extending through said opening over the adjacent edge of the casing and detachably engaging the same, said lip presenting a depression for the escape of overflow from the trough through the opening to the exterior of the casing; together with means at the interior of the casing to laterally deflect the tank and engage the end of said lip with the casing by the insertion of the tank in the casing.

2. A waterer of the class described, including an outer casing, a separate tank removably fitting within the casing, a trough rigid on the tank at the outside thereof, said casing having an opening at the trough through which the latter is accessible, and means between the tank and casing to deflect the tank and trough laterally in the direction of said opening to project the outer end of the trough through said opening when the tank is placed in the casing.

3. A hog waterer including an outer casing, a separate tank within the casing and adapted to be removably supported therein, a trough on the tank, said casing having an opening at the trough, a downturned lip on the front of the trough adapted to fit over the edge presented by the casing at the bottom of the opening, and means in the casing adapted to engage the tank as the latter takes its place in the casing, and deflect the tank and the trough laterally to thereby position the trough with respect to the opening and engage the lip with the adjacent edge of the casing.

4. A hog waterer including an outer casing, a tank removably fitting within the casing, a trough on the tank at one side, said casing having an opening at the trough, centering means in the casing at the interior to center said tank, said means including vertical elements on the casing, said elements presenting beveled edges to be engaged by the tank when the latter is placed in the casing to thereby deflect the casing and trough laterally to position the trough with respect to the opening in the casing.

5. A waterer of the class described, including an outer casing, a water tank removably fitting within said casing and spaced therefrom, and a trough rigid on the tank on the outside to be removable therewith, said trough communicating with the interior of the tank to be fed thereby, said casing having an opening at the trough and presenting a vertical edge portion at the bottom of said opening, the front wall of said trough having a lip to extend through said opening and presenting a downturned hooked outer edge adapted to engage over the vertical edge of the casing at the opening, to detachably engage the same.

FRANK HOWARD PAGE.